Oct. 20, 1936.  H. D. CORWIN  2,057,820

CUTTING AND PROFILING APPARATUS

Filed Dec. 14, 1932  4 Sheets-Sheet 1

Inventor
Howard D. Corwin
by Lauren H. Beaman
Attorney

Inventor
Howard D. Corwin
by (signature)
Attorney

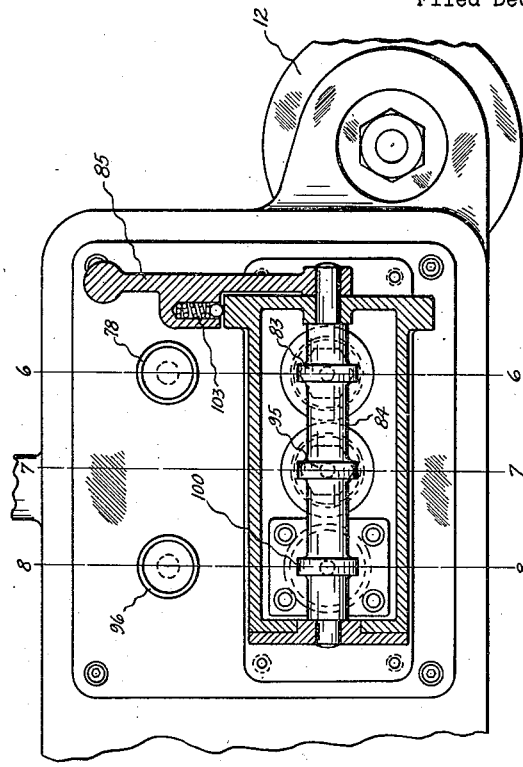

Patented Oct. 20, 1936

2,057,820

UNITED STATES PATENT OFFICE 2,057,820

CUTTING AND PROFILING APPARATUS

Howard D. Corwin, Jackson, Mich., assignor, by mesne assignments, to Air Reduction Company, Incorporated, New York, N. Y., a corporation of New York Application December 14, 1932, Serial No. 647,187

18 Claims. (Cl. 266—23)

The present invention relates to improvements in a gas cutting and profiling apparatus of the type in which a cutting torch is given a universal movement in a plane at a uniform speed to effect the cutting and profiling of material according to a desired pattern.

One of the objects of this invention is to provide an apparatus of the above type having the tracing mechanism and cutting torch located in substantially the same vertical plane facilitating the inspection of both the tracing and cutting operation.

Another object is to provide a supporting framework capable of universal movement in a plane in an apparatus as characterized in the preceding paragraph, which will enable the cutting torch to be moved out of vertical axial alignment with the tracing mechanism without affecting its ability to trace a path identical with that described by the tracing mechanism.

Another object is to provide a novel manually guided tracing and propelling head for traversing the cutting torch at a uniform but variable speed along any desired path.

A further object is to provide a novel control system for the cutting fluids and operation of the propelling head.

In accordance with one feature of the invention an upper carriage, which is supported on a lower carriage to obtain universal movement in a plane, includes a rigid member having arms by which a torch and tracing mechanism are supported one above the other, and the points of support of the upper carriage are so located that the weight of the rigid member, the torch, and the tracing mechanism urge the upper carriage into firm supported engagement with the lower carriage.

These and other objects, features, and advantages residing in the present invention will be clearly brought out as the description progresses and will be set forth in the claims. It is to be understood, however, that I do not desire to be limited to the exact details of construction herein set forth, but intend to include as part of my invention all such changes and modifications which would occur to those skilled in this art and fall within the scope of the appended claims.

In the accompanying drawings, wherein a preferred embodiment of my invention is disclosed for the purpose of illustration, Fig. 1 is a perspective view of the assembly.

Fig. 4 is a perspective view of the tracing and propelling head.

Fig. 5 is a detail view of the cutting fluid control located upon the tracing and propelling head.

Figs. 6, 7, and 8 are cross sectional views taken upon lines 6—6, 7—7, and 8—8, respectively, of Fig. 5.

Figure 10:
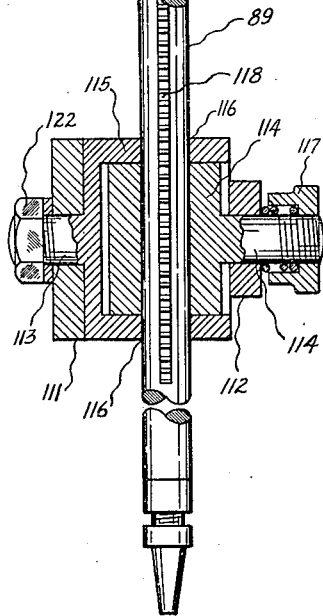

Figs. 9 and 10 are detail views of the cutting torch adjustment.

Generally considered, the preferred embodiment of the present invention consists of side frames supporting a horizontal tracing table having parallel tracks bordering two sides of the same. A wheel carriage is supported upon the tracks and adapted to be traversed in opposite direction over the table. A second wheel carriage, capable of universal movement in a plane, is constituted as a U-shaped frame extending above and below the tracing table and is traversable in opposite directions upon parallel tracks located on the first carriage at right angles to the tracks on the tracing table. A tracing and propelling head is located above the tracing table at one end of the U-shaped carriage while a cutting torch is secured to the other end below the tracing table. The tracing and propelling head consisting of a tracing column, preferably manually guided upon a drawing or the like supported in a flat state upon the tracing table. A tracing and propelling wheel is located at the lower end of the column and driven through a variable speed mechanism. During the tracing and propelling operation the tracing wheel is supported upon the tracing table and the necessary traction is preferably provided by directing the weight of the variable speed mechanism upon the tracing column through selectively operated means. Control mechanism, preferably under the operation of a single lever, is located upon the tracing and propelling head to regulate the cutting fluids and the movement of the carriages.

Figure 1:
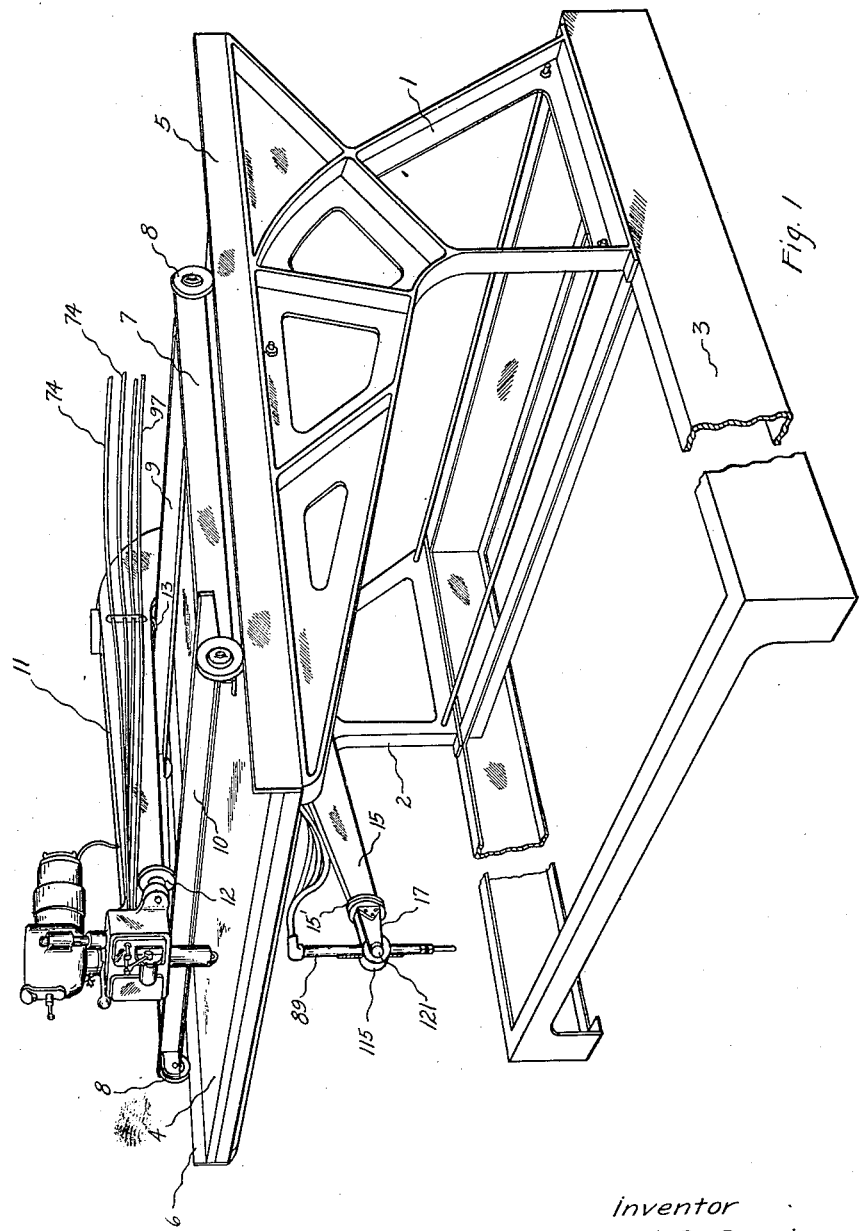
Figure 2:
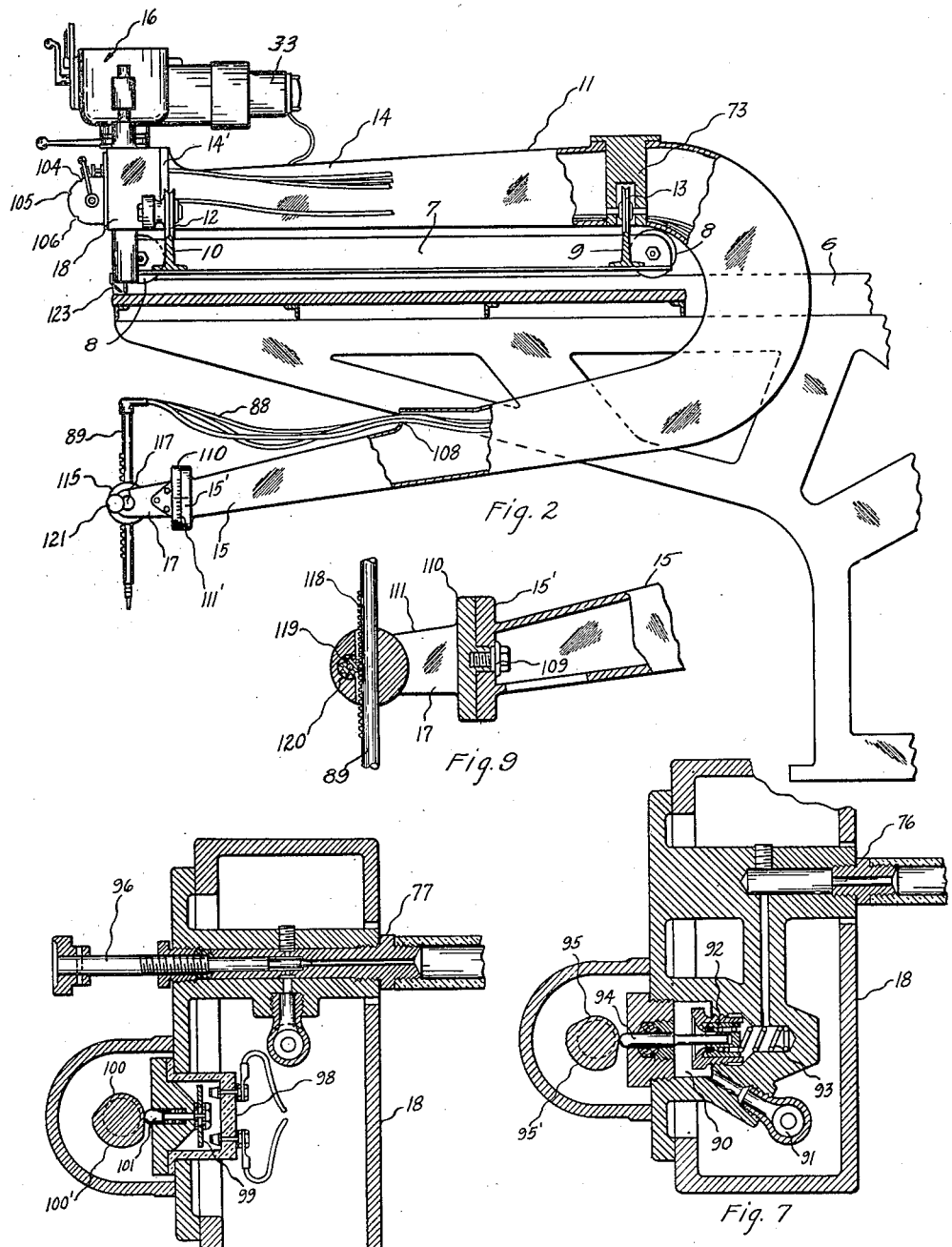
Fig. 2 is a cross sectional view taken through the tracing table intermediate the side frames showing a side elevation of the tracing and cutting carriage with certain sections broken.
Figure 3:
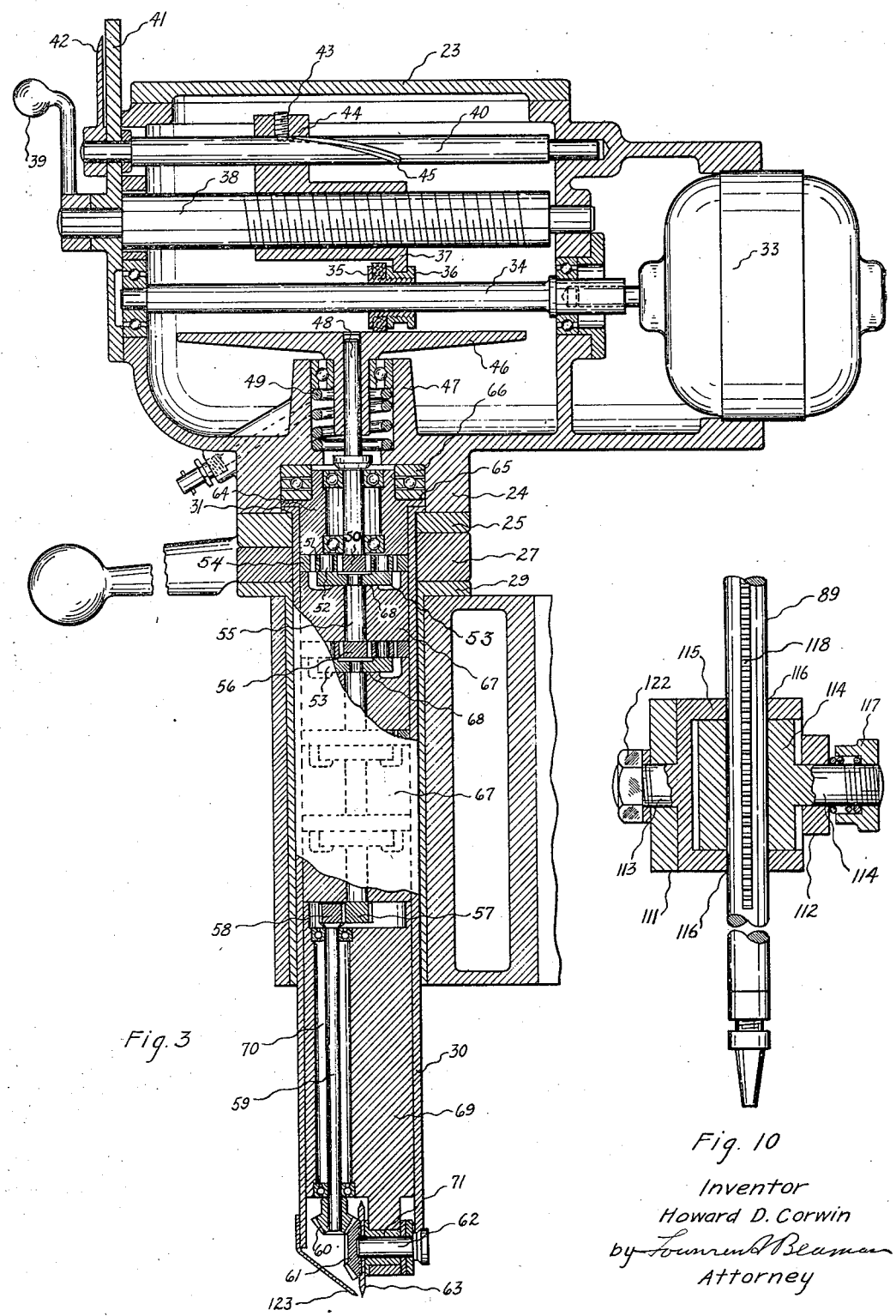
Fig. 3 is a cross sectional view taken upon the longitudinal center line of the tracing and propelling head.

Having specific reference to Figs. 1 and 2 of the drawings, cantilever side frames 1—2 are secured to a suitable base frame 3, the forward portion of which may be employed to support the material to be operated upon. A tracing table 4 is supported between the side frame 1—2 with tracks 5—6 bordering the sides thereof and preferably extending rearwardly thereof a substantial distance, as will be more fully described.

A carriage 7, having grooved wheels 8, preferably equipped with anti-friction bearings, is supported upon the tracks 5—6 and adapted to be readily traversed in opposite direction thereon. A second carriage 11 with wheels 12—13 is supported upon parallel track members 9—10 located upon the carriage 7 at right angles to the tracks 5—6. The second carriage 11 includes a U-shaped member consisting of upper and lower arms 14—15, the ends of which are flanged at 14'—15' to receive the tracing and propelling head 16 and cutting torch mounting 17. The arms 14—15 are preferably tubular to receive the tubings conducting the fluids to the cutting torch, as will be more fully described.

As shown in Figs. 1 to 4, the tracing and propelling head 16 consists of a cast housing 18 affixed to the arm 14 through the flange 14'. Uprights 19 are anchored upon the housing 18 upon which sleeves 21—22, integral with the housing 23 are guided in vertical movement and prevent rotation of the housing 23 as will be more fully described. The lower portion of the housing 23 is provided with an apertured boss 24. To enable the housing 23 to be moved relative to the housing 18, suitable manually operated means are provided, preferably in the form of opposed collar members 25—27 having sloping contacting faces 26. The collar 25 is affixed to the boss 24 in any suitable manner while the collar 27 has a handle 28 associated therewith and is capable of partial rotation upon a seat consisting of the flanged end 29 of a liner 32 inserted in a cored hole through the housing 18. The tracing column 30 is flanged at 31 and is supported upon an annular shoulder resulting from the difference in internal diameter between the boss 24 and the collar 25 secured thereto. It will thus become apparent that movement of the handle to the right, as viewed in Fig. 4, will elevate both the housing 23 and the tracing column 30. And that upon movement of the handle 28 in the opposite direction from the latter position the assembly of the housing 23 and column 30 are adapted to gravitate to a lowered position.

Although my invention is not limited to any particular mechanism for driving the tracing and propelling wheel located on the tracing column, the following variable speed reduction mechanism has given satisfactory results: An electric motor 33 is located in the housing 23 and drives a shaft 34 journaled therein having a friction roller 35 splined or otherwise slidably secured thereto. The roller 35 includes a grooved collar portion 36 in which a forked control member 37 is received. The member 37 is threaded to receive a screw 38 which is manually operated by a handle 39. An indicator for the location of the roller 35 is provided by a shaft 40 having one end thereof extending through a plate 41 and having a pointed indicating arm 42 secured thereto cooperating with a scale upon the plate 41 calibrated to the feed of the tracing and propelling roller. Movement of the shaft 40 is synchronized with that of the roller 35 through a cam follower 43 located in a yoke member 44 integral with the control member 37. The shaft 40 is provided with a spiral cam groove 45 in which the follower 43 is adjustably received.

A friction driven disk 46 is mounted for rotation upon a vertical axis within an internal boss 47. The disk 46 is slidably splined upon a jack shaft 48 and is continuously urged into contact with the roller 35 by a spring 49. With the desired variation of speed effected by the adjustment of the roller 35 across the face of the disk 46, a constant speed reduction is effected through a series of planetary gearing. The lower end of the shaft 48 is provided with a pinion 50. Planetary gears 51 loosely mounted on pins 52 located on a spider 53 mesh with the pinion 50 and a fixed internal gear 54. The driven spider 53 is fixed to second jack shaft 55 carrying a pinion 56 corresponding to the pinion 50, and which drives the second in series of planetary reduction gearing in a similar manner. As illustrated, four stages of planetary reduction gearing has been shown. Obviously, the speed of the electric motor employed, the reduction effected in each stage and the desired speed of the tracing and propelling roller will determine the number of stages of reduction required in any given instance. The pinion 57 of the last stage of planetary reduction meshes with a gear 58 fixed on a shaft 59 driving bevel gears 60—61. The gear 61 is fixed to a shaft 62 and rotates the tracing and propelling wheel 63 therewith. The surface of the wheel 63 is preferably roughened in any well known manner to increase the coefficient of friction. A spacing member 64 is located above the gear 54 and fixedly received within the column 30 with the upper portion thereof constituted as an annular shoulder 65 upon which a thrust bearing 66 is supported through which the entire weight of the housing and its associated parts is transmitted to the column 30 to provide the necessary traction upon the tracing wheel 63 when the same is in contact with the tracing table 4 with the collar 27 in the position shown in Fig. 4. Spacing members 67 are provided between the internal gears employed in the several stages of planetary reduction gearing. These members have recessed upper portions with bearing surfaces 68 for the spiders 53. In the lower end of the column 30, the spacing member 69 is drilled at 70 to provide for the shaft 59 and again at 71' to provide for the bushing 71 for the shaft 62. The spacing members in the column 30 as well as the internal gears are retained in position and held against rotation in any well known manner, such as by press fitting, groove and rib, etc.

The wheels 12 located upon opposite sides of the housing 18 support the front end of the carriage 11 upon the track 10. Preferably, the rear end of the carriage is supported upon a single wheel 13, mounted upon a bearing 73 located within the tubular frame, to contribute to the structure the advantage of three point support. The wheels 12 are far enough apart to give the carriage 11 stability in its direction of movement along the track 10. The wheels 12 and 13 are so located with respect to the center of gravity of the combined masses of the carriage 11 and the structure which it supports that the weight of that carriage and its supported structure urges the arm 14 and tracing mechanism 16 downward and the wheels of the carriage 11 into firm supported engagement with both rails of the track on the carriage 7.

The gases utilized at the cutting torch are conducted to the apparatus from the usual source of supply through tubings 74 which are preferably held adjacent the arm 14 through the employment of brackets or the like. For example, city gas, cutting oxygen, and pre-heating oxygen are conducted through the various tubings 74 into the housing 18, where the pre-heating oxygen tubing is coupled with the conduit 75 (see Fig. 6), the cutting oxygen tubing coupled to the conduit 76 (see Fig. 7), and the city gas tubing coupled to the conduit 77 (see Fig. 8). The passage of the pre-heating oxygen through the conduit 77 into a chamber 79 is regulated by a needle valve 78. Passage of gas from the chamber 79 is prevented by a valve 80 held to a seat by a spring 81 except as at such times as the valve 80 is moved to the right, as viewed in Fig. 6, by a plunger 82 in contact with the high portion 83' of the cam 83 located upon the shaft 84 manually rocked by the handle 85. With the valve 80 open the pre-heating gas flows into the chamber 86, through the conduit 87 into the tubings 88 carried within the tubular arms 14 and 15 and extending to the torch 89 which may be of any well known construction and constitutes no part of this invention. In a similar manner the cutting oxygen conducted to the conduit 76 is prevented from flowing into the chamber 90, through the conduit 91 and to the torch 89 through the tubings 88, by a valve 92 held to a seat by the spring 93. This valve is likewise opened by a plunger 94 contacting with the high portion 95' of the cam 95 located on the shaft 84. The city gas, which in practice always remains ignited at the torch regardless of whether cutting is taking place or not, is regulated in its passage through the conduit 77 to the tubings 88 by a needle valve 96. The electric circuit for the motor 33 consists in a conduit 97 carried adjacent the tubings 74 into the housing 18 where the circuit is broken at a switch 98. The circuit is completed and the motor 33 started upon movement of the plunger 101 carrying the contact 99 (see Fig. 5) to the right, under the stress of the high portion 100' of the cam 100 located on the shaft 84. Obviously, other types of switches may be advantageously employed, especially upon increase in voltage. As shown in Fig. 4 a semi-cylindrical housing 102 encases the cam shaft 84. The handle 85 secured to the shaft 84 is provided with a releasable ball catch 103 adapted to coact with spaced notches 104, 105, and 106 located upon a semi-circular member 107.

The tubings 88, extending from the control upon the tracing and propelling head through the tubular arms 14—15, pass out through an opening 108 and are conducted into the top of the torch 89. Bracket 17 supporting the torch 89 is adjustably secured to the flange 15' by a lock nut and collar arrangement 109 threaded in a portion of the flange 110 extended through an aperture in the flange 15' and abutting the inner face of the flange 15'. Coacting scales 111' upon the flanges 15'—110 enables the angularity of the bracket 17 to be adjusted in one plane to a desired angle by loosening the lock unit and collar 109. The bracket 17 consists of spaced parallel arms 111—112. The arm 111 is integral with the flange 110 while the arm 112 is removably secured to the flange 110 through a bracket 112'. The outer ends of the arms 111—112 are apertured to receive a threaded arbor 113 integral with a swiveled member 115 and a threaded arbor 114 integral with a clamp member 114' located within a recess in the member 115. Through manipulation of the nut 122 the member 115 may be given any desired angularity. The torch 89 passed through aligned apertures 116 in the member 115 and through a drilled aperture in the clamp 114'. A spring nut adjustment 117 is threaded upon the arbor 114 for clamping the torch against the aperture 116. This construction holds the torch against accidental movement, but does permit the torch to be moved by positive movement without any adjustment of the clamp. A rack 118 is provided longitudinally of the torch 89 and cooperates with a pinion 119 located upon shaft 120 journaled in a bushing or the like in the swivel 115. A knob 121 is secured to the shaft 120 for operating the pinion 119 for raising and lowering the torch.

*Operation*

With the pattern, a reproduction of which is desired to be cut, presented upon a blueprint or the like, the same is laid upon the table 4 and affixed thereto in a suitable manner. The operator grips the tracing column 30 and positions the tracing and propelling wheel directly over the outlined pattern. Preferably a pointer 123 is provided to indicate the point of rolling contact of the tracing wheel. With the elevating cam 27 to the extreme right as viewed in Fig. 4, the wheel 63 barely clears the table 4 and the surface being traced. Upon movement of the cam 27 to the position shown in Fig. 4, the housing 23 will gravitate upon the uprights 21—22 together with the tracing column 30 until the wheel 63 is in contact with the tracing surface and supported by the table 4. In this position the entire weight of the housing 23 and its associated parts is supported upon the thrust bearing 66 and transmitted to the wheel 63 through the tracing column 30.

With the tracing and propelling wheel 63 properly positioned and the material to be cut or profiled properly located with respects to the cutting torch. The operator, having previously adjusted the pre-heating oxygen and city gas through the valves 78 and 96, respectively, and having adjusted the cutting oxygen at the container, now pulls the handle 85 down until the lock 103 engages the notch 104. This movement rocks the shaft 84 sufficient to engage the plunger 82 with the portion 83' of the cam 83 to open the valve 80 and admit the pre-heating oxygen to the torch 89. When the material being operated upon has received the proper pre-heating, the continued downward movement of the handle 85 bringing the lock 103 into the notch 105 will bring the portion 95' of the cam 95 into contact with the plunger 94 to open the valve 92 and admit the cutting oxygen to the torch. If only a hole is to be pierced the handle 85 is retained in the notch 105. However, to effect movement of the torch, further movement of the handle 85 brings the lock 103 into the notch 106 and moves the portion 100' of the cam 100 into contact with the plunger 101 closing the switch 98 to start the motor 23 which slowly rotates the tracing and propelling wheel 63. The portion of the column gripped by the operation is preferably knurled as at 124. During the cutting operation, the torch is uniformly traversed over the material being cut or profiled by the rotation of the column 30 by the operator to direct the travel of the wheel 63, supported upon the table 4, along the lines being traced. The column 30 is free to rotate in the liner 32 located in the housing 18 and relative rotation is effected between the housing 23 and the column 30 at the thrust bearing 66; the sleeve 21—22 prevents the housing 23 from rotating.

Although my improved apparatus is particularly adapted for cutting shapes reproduced directly from a blueprint or the like, I contemplate the positive gearing or engagement of the tracing wheel 63 with fixed or positive templets as is well known in the art.

From the foregoing description, it will be apparent that I have provided a cutting and profiling apparatus in which the tracing head and cutting torch are maintained in definite fixed relationship, tracing identical paths regardless of any relative adjustment. Furthermore, the cutting torch is so located with reference to the tracing wheel that the operator may readily observe both operations. Also, means have been arranged for controlling the cutting fluids from adjacent the tracing wheel rather than at the torch as is conventional. In addition the structural design is exceedingly flexible. By increasing the depth of the U-shaped carriage the tracing table may be enlarged and the track bordering the same extended to greatly increase the size or shape of material which may be cut or profiled.

Having thus described my invention, what I claim as new and desire to protect by Letters Patent is:

1. A machine of the class described comprising a tracing table, parallel tracks bordering the sides of said table, a wheel carriage supported on said tracks supporting additional parallel tracks at right angle to said first tracks, a continuous tubular U-shaped member extending above and below said table, a tracing and propelling head secured to one end and a cutting torch secured to the other end of said member, wheels located upon opposite sides of said head and supported on said second tracks, a wheel having its bearing located within said tubular member also supported upon said second tracks, said head cooperating with said table to impart movement to said member and its associated parts.

2. A machine of the class described comprising a cutting torch supporting frame universally movable in a plane, two separate parts connected with said supporting frame so as to be freely movable perpendicularly as a unit with respect to the movement of said supporting frame, a driving motor mounted on one of said parts and movable therewith, a driven tracer connected with the other of said parts and movable therewith, said part supporting said tracer being rotatable relative to first part and constituting a manually controlled column for said tracer, and manually operable means for bodily raising and lowering said parts as a unit.

3. A machine of the class described comprising a cutting torch supporting frame universally movable in a plane, two separate parts connected with said supporting frame so as to be freely movable perpendicularly as a unit with respect to the movement of said supporting frame, one of said parts being located above the other and held against rotation relative to said frame, the other of said parts being swiveled in said frame for rotation relative to said other part and constituting a manually controlled column for a tracer, a driving motor mounted upon said upper part, a driver tracer wheel mounted in said lower part, and variable speed mechanism between said tracer and motor.

4. In combination with a machine of the class described having a movable carriage, a housing guided for vertical movement and restrained against rotary movement upon said carriage, a tracing and propelling column likewise guided for vertical movement, but swiveled in said carriage, selectively operable cam means for imparting vertical movement to said housing and column to support the same from said carriage in one position, a pattern support, said column with said means in another position being supported upon said pattern support and in turn supporting said housing, and interconnected propelling means located in said housing and column.

5. In combination with a machine of the class described having a movable carriage, variable speed mechanism capable of vertical movement only with respects to said carriage, a tracing and propelling wheel swiveled in said carriage and capable of vertical movement, selectively operable cam means for imparting vertical movement to said mechanism and wheel as a unit and supporting the same from said carriage, a tracing table, said wheel and mechanism in one position being supported as a unit upon said table independently of said carriage, and interconnection between said wheel and said mechanism.

6. In combination with a machine of the class described having a movable carriage, variable speed mechanism capable of vertical movement only with respect to said carriage, a column swiveled in said carriage and capable of vertical movement, selectively operable cam means for imparting vertical movement to said mechanism and column as a unit and supporting the same from said carriage, a tracing table, said column and mechanism in one position being supported as a unit upon said table independently of said carriage, speed reducing gearing carried within said column, a tracing and propelling wheel supported in said column and interconnection between said variable speed mechanism and said reduction gearing for driving said wheel.

7. In combination with a machine of the class described having a movable carriage, cutting torch and propelling mechanism spaced on said carriage, conduits for conducting fluids to said torch, valve mechanism located adjacent said propelling mechanism for regulating the flow of fluids through said conduits, a rock shaft having a plurality of cams, means operated by certain of said cams for successively regulating the several fluids employed in the cutting operation through said valve mechanism, and means operated by one of said cams for regulating said propelling mechanism.

8. A machine of the class described comprising a framework, a pattern support carried by said framework, a rigid vertically disposed U-shaped structure having upper and lower portions, means capable of universal movement in a plane supporting said structure upon said framework, said means solely supporting said structure through supporting engagement with the upper portion, said upper portion being disposed over said pattern support, said lower portion being disposed beneath said pattern support, said upper portion being supported at horizontally spaced points, the center of mass of said lower portion being located in a plane between said points of support of said upper portion, and tracing and cutting torch mechanisms carried by said upper and lower portions and rigidly spaced thereby whereby said mechanisms are capable of traversing identical paths irrespective of vertical alignment.

9. A machine of the class described comprising a framework, a pattern support carried by said framework, a superstructure including means for supporting the same over said pattern support for universal movement in a plane, said means supporting said superstructure at horizontally spaced points, said superstructure comprising an upper portion disposed over said pattern support and a lower portion disposed beneath said pattern support, said portions being rigidly connected and the lower portion being solely supported by said upper portion, the center of mass of said superstructure being located between said spaced points of support whereby said superstructure is firmly supported over said pattern support, and tracing and cutting torch mechanisms carried by said upper and lower portions whereby said mechanisms are capable of traversing identical paths irrespective of vertical alignment.

10. In combination with a machine of the class described having a movable carriage comprising a fixed housing, a vertical tracing and propelling column swiveled in said housing and adapted to be supported upon a pattern in one position, a vertically movable motor and a variable speed housing located above said fixed housing and guided for vertical movement thereby, said second housing and column being movable as a unit, and operable means carried by said fixed housing in one position elevating said second housing and column, said second housing being supported through said column in another position of said means.

11. In a machine of the class described, a tracing and propelling head, a remote control mechanism for regulating the cutting fluid comprising a conduit for conducting the fluid to the torch, valve mechanism carried by said head for regulating the amount of fluid flow from a source of supply to the torch, a two position valve also carried by said head and located in said conduit for fully opening or closing the same to fluid passage and means for operating said second valve.

12. In a machine of the class described, a tracing and propelling head including an electric motor circuit, a remote control mechanism for regulating the cutting fluid comprising a conduit for conducting the fluid to the torch, valve mechanism carried by said head for regulating the amount of fluid flow from a source of supply to the torch, a two position valve also carried by said head and located in said conduit for fully opening and closing the same to fluid passage, and means for successively operating said second valve and regulating said motor circuit.

13. In combination with a machine of the class described having a movable carriage, cutting torch and propelling mechanism spaced on said carriage, a conduit for conducting fluid to said torch, valve mechanism located adjacent said propelling mechanism for regulating the flow of fluid through said conduit, and means including cams for successively regulating the fluid through said conduit and regulating said propelling mechanism.

14. A machine of the class described comprising a framework, including a horizontally disposed pattern support, a carriage supported upon said framework for movement in a horizontal plane, a second carriage supported upon said first carriage and capable of universal movement in a horizontal plane, said second carriage including a rigid U-shaped member extending above and below said pattern support, tracing and cutting torch mechanisms attached to the upper and lower arms of said U-shaped member adjacent the ends thereof, spaced antifriction means for supporting said second carriage for movement upon said first carriage, certain of said means being located with reference to said second carriage so that the weight of the lower arm of said U-shaped member acts to urge the upper arm and tracing mechanism downwardly toward said pattern support and said second carriage into firm supported engagement with said first carriage.

15. A machine of the class described comprising a framework, including a horizontally disposed pattern support, a carriage supported upon said framework for movement in a horizontal plane, a second carriage supported upon said first carriage and capable of universal movement in a horizontal plane, said second carriage including a rigid U-shaped member extending above and below said pattern support, tracing and cutting torch mechanisms attached to the upper and lower arms of said U-shaped member adjacent the ends thereof, spaced antifriction means for supporting said second carriage for movement upon said first carriage, certain of said means being so located with reference to said second carriage as to constitute a fulcrum to the same side of the center of mass of both said upper and lower arms and their associated structure whereby the upper arm and tracing mechanism is urged downwardly and said second carriage is urged into a firm supporting engagement with said first carriage.

16. A machine of the class described comprising a framework, spaced parallel tracks carried by said framework, a wheeled carriage supported upon said tracks for straight line movement in a horizontal plane, spaced parallel tracks upon said carriage disposed at right angles to said first tracks, a rigid U-shaped structure constituting a second carriage, wheels upon said second carriage engaging with the tracks upon said first carriage to support said second carriage for straight line movement upon said first carriage and for universal movement in a horizontal plane, the arms of said U-shaped structure being of substantially the same length and being disposed in substantially the same vertical plane above and below said first carriage, tracing and cutting torch mechanisms located adjacent the ends of said arms in substantial vertical alignment whereby the cutting operation may be readily observed from the tracing station, said lower arm being entirely supported from said upper arm, the wheels upon said second carriage being located upon said upper arm and constituting the only support for said second carriage upon said first carriage, certain of said wheels upon said upper arm being sufficiently spaced inwardly from the end of said upper arm and adjacent the connection between said upper and lower arms whereby the weight of said lower arm acts to urge said second carriage downwardly to a firm supported position upon said first carriage.

17. A machine of the class described comprising a framework, including a horizontally disposed pattern support, parallel tracks disposed upon opposite sides of said pattern support, a wheeled carriage supported upon said tracks for straight line movement in a horizontal plane, spaced parallel tracks upon said carriage, a second wheeled carriage supported upon the tracks upon said carriage for universal movement in a horizontal plane, said second carriage having a rigid body portion disposed above and across said pattern support, tracing mechanism carried upon one end of said portion, wheels located upon said portion adjacent extreme parts of said portion extending above said pattern support, a continuation of said body portion defining a deep throat and embracing one edge and extending beneath said pattern support with its major portion thereof disposed between the supporting wheels for said second carriage, a cutting torch carried by said body portion disposed beneath said portion in substantially vertical alignment with said tracing mechanism, the construction and arrangement of said second carriage and its associated parts being characterized by the fact that the body portion beneath the pattern support acts to hold said second carriage in firm supported position upon said first carriage and urging said tracing mechanism toward the pattern support and the cutting operation may be readily observed from the tracing station.

18. A machine of the class described comprising a framework having vertically disposed side members and an elevated horizontally disposed tracing table supported between said side members, parallel tracks disposed upon opposite sides of said tracing table, a wheeled carriage supported upon said tracks for straight line movement in a horizontal plane and having parallel tracks disposed at right angles to said first tracks, a second wheeled carriage supported upon said tracks for universal movement in a horizontal plane, said second carriage having a rigid main body structure of general U-shaped configuration with the arms thereof disposed in substantially the same vertical plane and located above and below and defining a deep throat embracing one edge of said tracing table, a tracing and propelling head carried at one end of said body structure disposed above said tracing table, wheels spaced on opposite sides of said head and operating upon one of said tracks of said first carriage to impart two points of support to said second carriage, a third wheel spaced longitudinally of said body structure with reference to said head and adjacent that portion of said body structure embracing one edge of said tracing table for operating engagement upon the other of said tracks of said first carriage for imparting a third point of support to said second carriage, a cutting torch mechanism carried at the end of said body structure disposed below said tracing table and in substantial vertical alignment with said head whereby the cutting operation may be readily observed from the tracing station, the major portion of said body structure located beneath said tracing table being located forward of said longitudinally spaced wheel whereby the weight of said body structure and cutting torch disposed below the tracing table tends to increase the stability of the supporting structure of the second carriage upon the first carriage.

HOWARD D. CORWIN.